(12) United States Patent
Distaso et al.

(10) Patent No.: US 9,157,640 B2
(45) Date of Patent: Oct. 13, 2015

(54) OVEN PROVIDED WITH APERTURE FOR AIR ENTRY INTO ITS CAVITY

(75) Inventors: Tamara Distaso, Gemonio (IT); John Doyle, Buguggiate (IT); Michele Venezia, Taino (IT); Marco Giuliani, Travedona Monate (IT); Cristina Mazzetti, Varese (IT)

(73) Assignee: Whirlpool Corporation, Benton Harbor, MI (US)

(*) Notice: Subject to any disclaimer, the term of this patent is extended or adjusted under 35 U.S.C. 154(b) by 1598 days.

(21) Appl. No.: 12/575,677

(22) Filed: Oct. 8, 2009

(65) Prior Publication Data

US 2010/0139641 A1 Jun. 10, 2010

(30) Foreign Application Priority Data

Oct. 10, 2008 (IT) ................ MI2008A1790

(51) Int. Cl.
*A21B 3/02* (2006.01)
*F24C 15/00* (2006.01)
*A21B 1/26* (2006.01)
*F24C 15/20* (2006.01)
*A21B 3/04* (2006.01)
(Continued)

(52) U.S. Cl.
CPC .............. *F24C 15/006* (2013.01); *A21B 1/26* (2013.01); *F24C 15/2007* (2013.01); *F24C 15/322* (2013.01)

(58) Field of Classification Search
CPC ...... F24C 15/006; F24C 15/322; F24B 5/087; A21B 1/26; A21B 3/04; F23N 3/08; A47J 39/003

USPC ........ 126/21 A, 21 R, 285 R, 42, 39 B, 15 R, 126/193, 285.5; 99/473, 474, 475, 476
See application file for complete search history.

(56) References Cited

U.S. PATENT DOCUMENTS

| 252,887 | A | * | 1/1882 | Marsh .......................... 126/21 R |
| 926,217 | A | * | 6/1909 | Smith et al. ..................... 126/67 |
| 1,154,747 | A | * | 9/1915 | Dungan ....................... 126/15 R |

(Continued)

FOREIGN PATENT DOCUMENTS

| EP | 1201999 A2 | 5/2002 |
| EP | 2108891 A1 * | 10/2009 | .............. F24C 15/00 |

(Continued)

OTHER PUBLICATIONS

"EP_1201999_A2_I—MTrans.pdf", Machine translation for EP-1201999-A2, epo.org, Jul. 24, 2013.*

(Continued)

*Primary Examiner* — Gregory Huson
*Assistant Examiner* — Daniel E Namay

(57) ABSTRACT

An oven comprises a housing or structure presenting a plurality of inner walls and outer walls, the inner walls defining an oven cavity in which means are provided for cooking foods, the means comprising a grill for browning the foods, the oven also comprising a door for closing the cavity. At least one aperture is present in at least one of the walls of the oven cavity, or in the door, for selective connection to the environment external to the oven, such as to interceptably introduce fresh ambient air into the cavity, controllable interceptor means being provided at the aperture to enable this selectivity in introducing the ambient air into the cavity.

17 Claims, 1 Drawing Sheet

(51) Int. Cl.
*F24C 15/02* (2006.01)
*F24C 15/32* (2006.01)

(56) References Cited

U.S. PATENT DOCUMENTS

| | | | | |
|---|---|---|---|---|
| 1,169,694 | A | * | 1/1916 | Swisher .................. 126/21 R |
| 1,210,529 | A | * | 1/1917 | Pfeiffer ...................... 74/3.56 |
| 2,127,970 | A | * | 8/1938 | Gatons et al. ................ 126/36 |
| 2,264,657 | A | | 12/1941 | Brumbaugh |
| 2,408,331 | A | * | 9/1946 | Mills ........................ 219/400 |
| 2,417,842 | A | * | 3/1947 | Sanford et al. ............ 126/1 AE |
| 2,499,525 | A | * | 3/1950 | Person ...................... 219/401 |
| 2,511,328 | A | * | 6/1950 | Cline ........................ 219/400 |
| 2,524,272 | A | * | 10/1950 | Sage ........................... 432/91 |
| 2,525,614 | A | * | 10/1950 | Nelson et al. ........... 126/299 R |
| 2,586,023 | A | * | 2/1952 | Gillette ..................... 126/21 A |
| 2,953,419 | A | * | 9/1960 | Ingolia ....................... 312/276 |
| 3,032,028 | A | * | 5/1962 | Pearce et al. .............. 126/21 A |
| 3,051,158 | A | * | 8/1962 | Kimberley ................ 126/21 A |
| 3,053,963 | A | * | 9/1962 | Dills .......................... 219/413 |
| 3,224,220 | A | * | 12/1965 | Mills ........................... 62/380 |
| 3,266,409 | A | * | 8/1966 | Oyler ........................... 99/331 |
| 3,328,560 | A | * | 6/1967 | Dills .......................... 219/391 |
| 3,384,071 | A | * | 5/1968 | Body et al. ................ 126/197 |
| 3,423,568 | A | * | 1/1969 | Vonderhaar et al. ........ 392/310 |
| 3,512,514 | A | * | 5/1970 | Vonasch .................... 126/21 A |
| 3,672,908 | A | * | 6/1972 | Hice, Sr. .................... 426/523 |
| 3,682,156 | A | * | 8/1972 | Perl ........................... 126/21 A |
| 3,712,819 | A | * | 1/1973 | Field ........................... 99/400 |
| 3,780,721 | A | * | 12/1973 | Durth ....................... 126/21 A |
| 4,011,805 | A | * | 3/1977 | Vegh et al. ................... 99/467 |
| 4,410,030 | A | * | 10/1983 | Skala ......................... 165/236 |
| 4,444,175 | A | * | 4/1984 | Reynolds .................. 126/21 R |
| 5,041,298 | A | * | 8/1991 | Wallace et al. ............. 426/418 |
| 6,712,064 | B2 | | 3/2004 | Stacy et al. ................ 126/21 A |
| 6,866,033 | B2 | * | 3/2005 | Stacy et al. ................ 126/21 A |
| 7,296,565 | B2 | * | 11/2007 | Kim et al. .................. 126/198 |
| 7,331,119 | B2 | * | 2/2008 | Perry et al. ................... 34/168 |
| 7,368,684 | B2 | * | 5/2008 | Kim et al. .................. 219/400 |
| 8,039,775 | B2 | * | 10/2011 | Venezia et al. ............. 219/399 |
| 8,096,063 | B2 | * | 1/2012 | Perry et al. ................... 34/168 |
| 8,490,616 | B2 | * | 7/2013 | Venezia et al. ............. 126/190 |
| 8,525,080 | B2 | * | 9/2013 | Ruther ....................... 219/400 |
| 2002/0179588 | A1 | | 12/2002 | Lubrina |
| 2003/0051721 | A1 | * | 3/2003 | Stacy et al. ................ 126/21 A |
| 2003/0051722 | A1 | * | 3/2003 | Stacy et al. ................ 126/21 A |
| 2003/0051723 | A1 | * | 3/2003 | Gunawardena et al. .... 126/21 A |
| 2003/0070789 | A1 | * | 4/2003 | Mueller et al. ............... 165/61 |
| 2003/0070799 | A1 | * | 4/2003 | Mueller et al. ............. 165/254 |
| 2003/0145482 | A1 | * | 8/2003 | Perry et al. ................... 34/218 |
| 2004/0262303 | A1 | * | 12/2004 | Kang .......................... 219/757 |
| 2006/0137675 | A1 | * | 6/2006 | Kim et al. .................. 126/21 A |
| 2007/0278219 | A1 | * | 12/2007 | Claesson et al. ........... 219/702 |
| 2008/0120867 | A1 | * | 5/2008 | Perry et al. ................... 34/505 |
| 2008/0149088 | A1 | * | 6/2008 | Inada et al. ................ 126/21 R |
| 2008/0184985 | A1 | * | 8/2008 | Hasslberger et al. ....... 126/21 R |
| 2009/0255524 | A1 | * | 10/2009 | Venezia et al. ............. 126/198 |
| 2009/0255919 | A1 | * | 10/2009 | Venezia et al. ............. 219/399 |

FOREIGN PATENT DOCUMENTS

| | | | | |
|---|---|---|---|---|
| EP | 2108892 | A1 * | 10/2009 | .............. F24C 15/02 |
| GB | 1553675 | A | 10/1979 | |
| JP | 58193030 | A * | 11/1983 | .............. F24C 15/32 |
| JP | 59015730 | A * | 1/1984 | ................ F24C 1/02 |

OTHER PUBLICATIONS

Spitzer, David W. (2005). Industrial Flow Measurement (3rd Edition). ISA. Online version available at: http://app.knovel.com/hotlink/toc/id:kpIFME0001/industrial-flow-measurement.*

European Patent Application No. 09171563.1 filed Sep. 29, 2012. Applicant: Whirlpool Corporation. European Search Report Publication No. EP2175203A1, published Apr. 14, 2010.

* cited by examiner

OVEN PROVIDED WITH APERTURE FOR AIR ENTRY INTO ITS CAVITY

BACKGROUND OF THE INVENTION

1. Field of the Invention

The present invention relates to an oven in accordance with the introduction to the main claim.

The heating elements positioned in the oven cavity tend to heat both the cavity walls and each item positioned therein by heat transfer by natural convection, by forced convection using a cooking fan, or by irradiation. Heat convection is by heat transfer from the heating elements and from the heated physical parts of the oven to the air present within the oven cavity, and optionally by the operation of a cooking fan. Heat irradiation is by the infrared radiation emitted by the heating surfaces and heated surfaces towards the cooler surfaces, for example those of the food.

The cabinet in which the oven is installed is cooled by a cabinet cooling fan, external to the cavity.

That heat portion transferred by irradiation is more effective for food browning or grilling than that due to convection. In particular, irradiation enables the heat to penetrate less into the food than the heat transmitted by convection, but facilitates surface browning of the food relative to its degree of internal cooking.

2. Description of the Related Art

A drawback of known cooking methods is that a food placed in the oven cavity can exceed the point of optimum internal cooking, reached on termination of the cooking process, if it remains in the closed cavity after deactivation of the heating elements present therein.

Moreover, after removal of the food from the oven cavity, this latter remains hot for a considerable time period. This condition prevents rapid cleaning of the oven by the user. The condition also delays use of the oven for preparing another food if this requires cooking temperatures less than those used in the previous cooking/cleaning process.

There is also the problem that if the oven has been switched off but its cavity and closure door are still hot, persons, in particular children, can suffer burns if they come into contact with it even several minutes after switch-off.

The state of the art also comprises ovens in which a condensate exit stack is present, connected between the cavity and the cabinet cooling system (in particular, the ventilation channel), this stack conveying the now heated cooling air to the outside of the oven. A movable closure device is provided on this stack. Such ovens do not enable fresh air to be withdrawn and fed into the oven, i.e. taken directly from the environment outside the oven, as the air flow flows only towards the outside of the cavity (normally entrained by the venturi effect); this flow is in the form of air which is not fresh as it has already been used to cool the cabinet.

SUMMARY OF THE INVENTION

An object of the present invention is to provide an oven which is improved compared with known ovens.

A particular object of the invention is to provide an oven which enables a food contained within its cavity to be browned or surface finished while at the same time not involving or considerably limiting any continuation of oven cooking of the food by heat convection, but utilizing to its maximum effect the irradiation of the heating means present within the cavity.

Another object is to provide an oven of the aforestated type in which the cavity can be cooled within a very short time, which is in any event less than that of known ovens.

A further object is to provide an oven of the aforestated type, the cavity and door of which can be rapidly cooled to ambient temperature after the oven heating elements have been switched off, hence making its presence safer within an environment such as a kitchen.

Another object is to provide an oven which, if provided with pyrolysis self-cleaning means, presents rapid cavity cooling to facilitate the final cleaning operations by the user, especially those carried out manually.

A further object is to provide an oven of the stated type which has a short cooling time, such that any use of the cooling fan for the cabinet (in which the oven is present) after oven switch-off takes place is for only a limited time, which is shorter than that in known ovens, to hence achieve a noise reduction after termination of food cooking.

A further object is to provide an oven of the stated type by which any odours originating from the cooking fumes are eliminated during or on termination of oven use, by preventing their uncontrolled transfer from the cavity to the kitchen, and enabling them to be conveyed into an environment which is external to the oven or to the place where the oven is installed, and/or filtered.

Finally, a further object of the present invention is to provide an oven having apertures for air exchange between the cavity closed by the door and the outside, by which suffocation of any living being remained trapped in the oven when closed by its door, whether a child or an animal, in particular when the oven is inactive or no longer used, is prevented.

These and other objects which will be apparent to the expert of the art are attained by an oven in accordance with the accompanying claims.

BRIEF DESCRIPTION OF THE DRAWINGS

The invention will be more apparent from the accompanying drawings, which are provided by way of non-limiting example and in which.

DETAILED DESCRIPTION OF THE PREFERRED EMBODIMENTS

Figure 1:
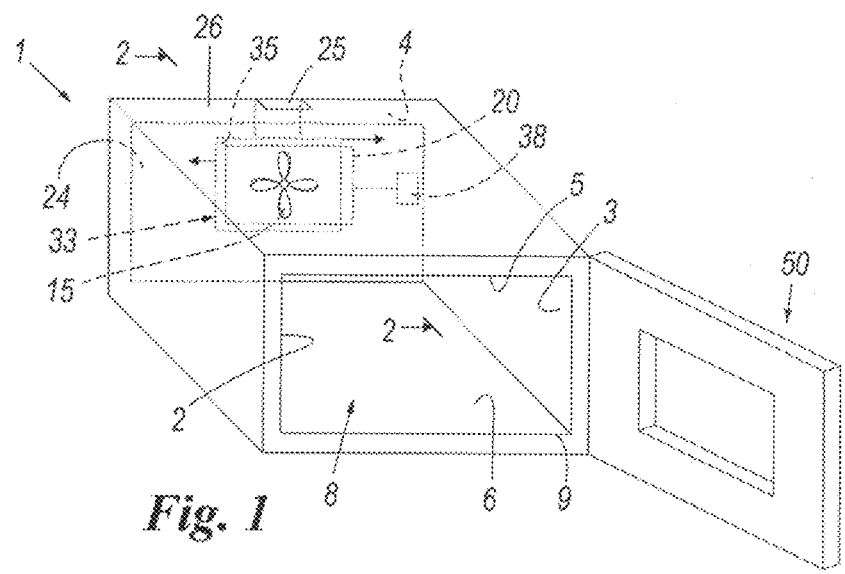
FIG. 1 is a schematic perspective view of an oven according to the invention.
Figure 2:
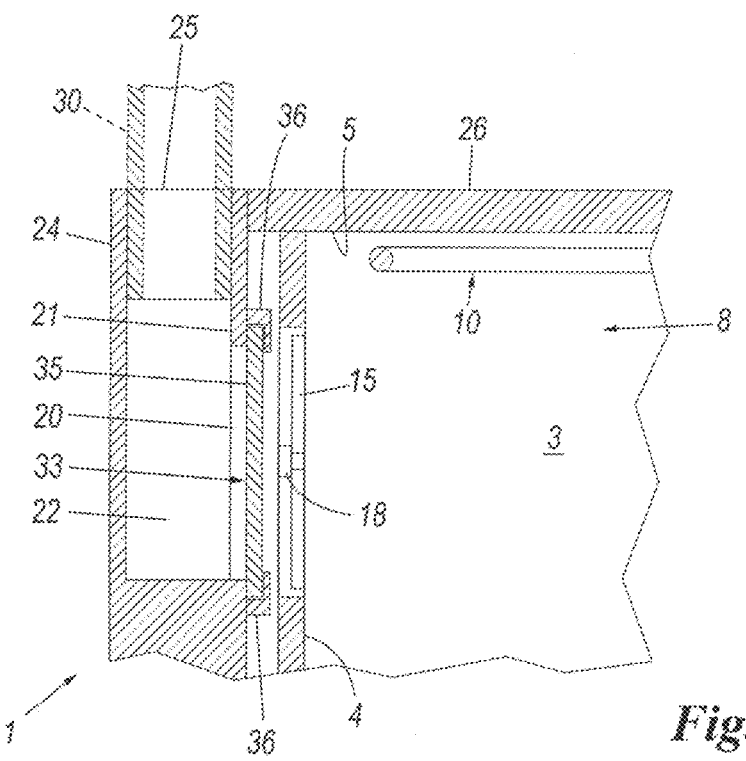
FIG. 2 is a section on the line 2-2 of FIG. 1.

With reference to the the figures, an oven comprises a housing or structure 1 presenting side walls 2, 3, a rear wall 4, an upper wall 5 and a lower wall 6. These walls define and bound a cavity 8 open at 9 where a door 50 is present to close the cavity 8. The oven comprises usual heating elements 10 of which only one, the upper element, is visible in FIG. 1; for simplicity, this heating element 10, usually defined by an electrical resistance element, is shown in proximity to the upper wall 5 of the cavity 8.

The oven also comprises a cooling fan for the cabinet in which the oven is inserted.

According to the invention, to improve oven performance and to enable it to quickly cool down after use, at least one aperture 20 is provided in at least one wall (the rear wall 4 in the example) and is connectable selectively (i.e. interruptably and preferably such as to vary its opening cross-section) to the environment external to the oven so as to be able to at least introduce fresh air (at ambient temperature) into the cavity 8. For this purpose, the aperture can cooperate conjointly with a fan 15 for cooling the cavity 8. Hence at the rear wall 4 there are positioned the cooling fan 15 for the cavity 8 and a cooking fan (not shown) for ventilating the cavity 8 during food preparation. Food preparation can comprise "oven cooking" achieved by convection-heating (by the elements 10) the air within the cavity 8, and "browning" or surface finishing or grilling, mainly achieved by irradiating the surface of the food in the cavity by means of the element 10. The cooking fan, together with the oven heating elements, can also be used in the automatic cleaning of the oven (pyrolysis).

The cooling fan 15 for the cavity 8 is driven by its own motor 18, as is the cooking fan, both fan motors being controlled by an oven operation control unit.

The cooling fan 15 for the cavity 8 could be located in a different position of the oven cavity 8 than that shown in the drawings, or even in the door 50.

In a preferred embodiment, the cavity cooling function and the air circulation function for convection cooking (by forced air) are performed by the same cooling fan 15, positioned within the oven cavity 8 and operated by a single motor 18.

With reference to the drawings, the aperture 20 is formed for example within a wall 21 positioned to the rear of the rear wall 4 and connected to the environment external to the oven by a channel or interspace 22 positioned beyond the wall 21 (in the opposite direction to that of the rear wall 4), between this latter and a rear outer wall 24 of the oven housing 1. The interspace 22 can be connected directly to the environment surrounding the oven by an aperture 25 provided in an upper outer wall 26 at the rear of the housing 1. Alternatively a tube 30 connected to a discharge opening into the environment external to the oven can be connected to the aperture 20.

In a further embodiment, the apertures 20 and 25, the channel 22 and the tube 30 can be entirely or partially located within the oven door 50.

For each of the aforedescribed methods for connecting the aperture 20 to the outer environment (external to the oven or to the place in which the oven is installed), one or more filters (replaceable or non-replaceable) can be provided to purify the air and/or to eliminate odours, the filters comprising known materials, such as activated carbon, catalysts or materials of equivalent function designed for this purpose.

Manually or automatically operable interception means 33 are positioned at the aperture 20 to totally or partially close the aperture as required, to configure a particular surface section of the air interchange conduit between the oven and the outer environment. In the example shown in the figures, these interceptor means 33 are a mobile wall 35 slidable along guides 36 and operated by an actuator 38 controlled by the aforesaid oven control unit. This actuator 38 can however be of any other known type (for example controlled by a stepping electric motor, by a relay device, or by shape memory materials) and be positioned in any preferably heat shielded position of the oven housing 1, in known manner.

The interceptor means 33 can also be formed differently, for example as a plurality of movable bodies defining a closure similar to a "venetian blind" or be defined by several elements movable in different directions or be defined by a fan element or by superposable grids. These means 33 can partially or totally intercept the aperture 20 as required, by a command reaching the actuator 38 from the oven control unit, or by manual action.

The size of the cross-section of the aperture 20 through which the air flow communicates with the outside, or of an equivalent plurality of apertures, can have a maximum such that a living being, whether a child or an animal, which can undergo suffocation if accidentally trapped within the oven, is able to breathe, even with the door closed. According to studies and tests carried out, the minimum size of the cross-section must be at least 700 mm$^2$, preferably about 750 mm$^2$, for example 744.5 mm$^2$.

By virtue of the invention, fresh ambient air can be introduced into the oven cavity 8. This can be done either during food preparation, in one or more different steps, or subsequently at the end of this preparation. For example, after attaining the desired "oven cooking" point, the control unit can operate the actuator 38, in accordance with its own algorithm based for example on the cooking time or on the power and time of activation of the heating elements 10, such that air can penetrate into the oven cavity 8 before commencement of the food browning stage. This results in a temperature decrease in the cavity and a lesser transfer of heat to the food by convection. Hence there is a substantial reduction in the "oven cooking" process (until it stops), whereas the food continues to receive energy by irradiation (for browning).

The flow of air introduced into the cavity can also be increased and controlled by activating the cavity cooling fan 15 and regulating the velocity of this fan.

It is also possible to make an optimal calculation of the time required to completely fill the cavity 8 with ambient air, so achieving a complete air change, while still maintaining the heating elements 10 active. This calculation is possible by calculating the flow rate by the following formula:

$$\text{Flow rate (l/s)} = A \text{ (m}^2\text{)} \times \text{vel.air (m/s)} \times 1000 \quad [F1]$$

where:
A=area of aperture 20
Vel.air=velocity of the air moved by the fan at cavity entry.
The flow rate calculation enables the flow time (time for cavity filling or emptying) to be derived, i.e.

$$\text{Emptying time [s]} = [\text{volume of oven cavity (l)}]/[\text{flow rate (l/s)}] \quad [F2]$$

Using this command algorithm which enables an optimal cavity emptying time to be calculated, the control unit, by acting on the actuator 38 of the interceptor means 33 to vary the air passage cross-section of the aperture 20 and/or on the motor 18 of the cooling fan 15 of the cavity 8 to regulate the air velocity in order to control the flow rate, is able to effect air change/introduction for the cavity 8 in accordance with the optimal times in relation to the oven operating method, either for a convective cooking or a browning/grilling process.

In other words, knowing the parameters A, vel.air, oven cavity volume and air flow imposed by the fan, the flow time can be regulated to interact with the various cooking and cleaning algorithms, in order to optimize their results.

In a similar manner, the hot air can be emptied from the cavity 8 when the oven heating elements are switched off, to shorten the waiting time, for example on termination of pyrolysis before manual cleaning, just as malodorous vapours can be removed from the oven cavity 8 via the aperture 20 by the cooling fan 15 and discharged outside the room.

The oven of the invention can also be provided with one or more apertures formed directly in the oven walls 2, 3, 4, 5, 6 or in the door 50 and provided with their own elements 33 for varying the areas A of these apertures, which act independently or in combination on the closure or forced ventilation entry, possibly without combined operation with the cooking fan and/or cooling fan 15 for the cavity 8.

Again in this case one or more conduits can be provided, associated or not associated with one or more filters, for intake of fresh air from the outer environment and/or for expelling hot air to the outside.

Finally, when the oven is no longer to be used, or each time the oven is in a non-operative condition, i.e. with its cavity at ambient temperature, or when the oven is out of use, the flow interceptor means 33 totally uncover the apertures to enable air change between the cavity closed by the door and the outer environment, these being dimensioned to prevent suffocation of a living being which has accidentally remained trapped in the oven cavity.

The oven as formed attains all the objects of the aforegoing invention.

A preferred embodiment of the invention has been described. Others are however possible and are to be considered as falling within the scope of the following claims, including the possible combinations of the embodiment variants and/or of the individually described characteristics.

The invention claimed is:

1. An oven, comprising:
    a housing or structure, the housing or structure having a plurality of inner walls and outer walls, the inner walls defining an oven cavity provided with a door for closing the cavity, a convection-cooking element comprising a cooking fan and heating element, wherein the heating element comprising at least a grill for separately browning the at least one food item with the cooking fan deactivated,
    at least one aperture being present in at least one of the inner walls of the oven cavity, and in the door, for direct connection to the environment external to the oven, the oven comprising the at least one aperture for introducing ambient air into the cavity during food preparation with the cooking fan in at least one or more different steps, or subsequently a cooling fan cools the cavity at the end of said food preparation and prior to a food browning stage;
    a controllable interceptor being provided at the aperture to enable selectivity in introducing the ambient air into the cavity; and,
    a control unit configured to operate an actuator in accordance with an algorithm based on at least one of a cooking time and on the power and time activation of said heating element for cooking foods, such that air penetrates into the oven cavity before commencement of the food browning stage such that an outer surface of the food is irradiated by the heating element.

2. The oven according to claim 1, wherein the at least one aperture is formed directly in a wall bounding the oven cavity, preferably in the rear wall thereof, the at least one aperture forming a first aperture, the first aperture being connected to a conduit or interspace positioned within the oven housing and opening into a second aperture positioned in an outer wall thereof.

3. The oven according to claim 2, wherein the first aperture or the second aperture cooperates with a tube connected to a wall bounding the room in which the oven is positioned and through which that produced in aerial form within the oven cavity is discharged to the outside of the room.

4. The oven according to claim 2, wherein the tube or the conduit cooperates with filter elements.

5. The oven according to claim 2, wherein the first aperture is formed within an additional wall spaced from that of the oven cavity and positioned between that and an outer wall thereof, the interspace for air movement relative to the oven cavity being present between the additional wall and the outer wall.

6. The oven according to claim 1, wherein the controllable interceptor are at least one of a movable wall subjected to an actuator controlled by an actuator control unit which controls the oven operation, or manually controlled.

7. The oven according to claim 6, wherein the movable wall is in the form of a "venetian blind", or a "fan", or superposed grids.

8. The oven according to claim 6, wherein that a control unit controls the entry and/or exit of the oven cavity air and determines the emptying/filling time for the cavity on the basis of the flow rate of air passing through each aperture connectable to the outside, the flow rate being a function of the area of the aperture and of the velocity of the air moved by the cooling fan for the cavity.

9. The oven according to claim 1, wherein the at least one aperture for introducing ambient air into the cavity consist of the cooling fan for the cavity cooperating with the first aperture.

10. The oven according to claim 1, wherein at least one of the cooling fan and the cooking fan is controlled by a control unit for the at least one fans, such as to modulate the air flow rate into the cavity through the first aperture.

11. The oven according to claim 1, wherein the aperture has an opening cross-section at least equal to 700 [$mm^2$] to enable the air in the cavity to change such as to prevent suffocation of a living being which has remained accidentally trapped within the oven cavity when in the inactive configuration.

12. The oven according to claim 1, wherein that when the oven is inactive, the controllable interceptor completely free the aperture.

13. A method for operating an oven, the method comprising a step of:
    configuring a control unit with an algorithm based on at least one of a cooking time and on a power and time activation of a heating element and a cooking fan for convection cooking at least one food item configured in an oven cavity, the heating element comprising a grill for browning the at least one food item;
    operating an actuator in accordance with the algorithm, such that a cooling fan supplies air penetrating into the oven cavity before commencement of a food browning stage, wherein during the food browning stage the heating element irradiates the food item outer surface with the cooking fan deactivated.

14. The method for operating an oven according to claim 13, further comprising a step of defining a predefined flow time for the cavity and a step of regulating the fan velocity to implement the predefined flow.

15. The method for operating an oven according to claim 14, wherein the predefined flow time depends on at least one step of the oven operation.

16. The method for operating an oven according to claim 14, wherein the flow of the air introduced into the cavity is increased and controlled by activating the cavity cooling fan and regulating the velocity of the fan.

17. The method for operating an oven according to claim 13, further comprising the steps of:
    calculating a flow rate by the formula Flow rate (l/s)=A ($m^2$)×vel.air (m/s)×1000; and
    calculating an optimal cavity emptying time, the control unit, by acting on the actuator of a controllable interceptor to at least vary the air passage cross-section of the aperture and on the motor of the cooling fan of the cavity to regulate the air velocity in order to control the flow rate, effecting air change/introduction for the cavity in accordance with the optimal time in relation to the oven operating method, either for a convective cooking or a browning/grilling process.

* * * * *